United States Patent [19]

Leib

[11] Patent Number: 5,020,817

[45] Date of Patent: Jun. 4, 1991

[54] WHEELCHAIR

[75] Inventor: Roger K. Leib, Los Angeles, Calif.

[73] Assignee: Rober K. Leib, Los Angeles, Calif.

[21] Appl. No.: 115,777

[22] Filed: Oct. 30, 1987

[51] Int. Cl.⁵ .............................................. B62M 1/14

[52] U.S. Cl. .................................. 280/250.1; 297/286

[58] Field of Search ............... 280/242 WC, 289 WC, 280/40, 642, 643, 644, 647; 297/285, 286, 287, 288, 294, 295, 282, 446

[56] References Cited

U.S. PATENT DOCUMENTS

| | | | |
|---|---|---|---|
| 268,799 | 5/1983 | Feldberg | D6/72 |
| 2,681,689 | 2/1957 | Breed | 280/289 WC |
| 4,529,246 | 7/1985 | Leib | 297/285 |

OTHER PUBLICATIONS

Active Aid Models 494, 495, 249, 250R, 261, 262-5, 262-20, 263-5, 263-24, 400 Series 1986.

ACTIVEAID, "Traum-Aid Models 494 and 495 Shower/Commode Trauma Wheel chairs", 1987.

Catalog from Activate, Inc., Redwood Falls, Minnesota, 1985.

*Primary Examiner*—Andres Kashnikow
*Assistant Examiner*—Richard Camby
*Attorney, Agent, or Firm*—Jeffrey G. Sheldon

[57] ABSTRACT

A wheelchair comprises front legs, rear legs and a rearwardly directed support. Large non-swiveling front wheels are located ahead of small swivel wheels which are affixed to the rear frame. The seat and backrest portions are pivotally attached to the front legs. The front legs are hollow tubes with rods passing through to engage rotatable rollers at the floor engaging ends of the legs. The rollers can be locked against rotation to brake the chair or be freely rotatable when the rods are elevated and the chair is to be moved. The structure provides a refined and aesthetically pleasing wheelchair suitable for long term, geriatric use. A foot support is foldable between an extended position ahead of the seat and a position below the seat, the foot support blending neatly with the seat portion of the chair.

35 Claims, 2 Drawing Sheets

WHEELCHAIR

BACKGROUND

This invention relates to wheelchairs. In particular it relates to an improved wheelchair especially suitable for geriatric purposes.

Wheelchairs of many designs are known. Generally some wheelchairs are structured for severely disabled persons, and relatively little thought has been given to refined aesthetics associated with the chair. Geriatric users and particularly persons in homes and skilled nursing facilities are confined to relatively unsightly chairs for most of their waking hours.

In hospital critical-care-type wheelchairs, part of the unsightliness arises from the harsh frame structures associated with these chairs. The seating may be of a commode type form for medical purposes, and generally there is extensive use of exposed metal surfaces for handles, foot rests, support structures, mechanical features and attachments. Also, the support from the seating section and back rest is generally of a rigid nature, not necessarily taking comfort into account. Such chairs accordingly do not address fully the needs of geriatric patients who would prefer to sit in more comfortable chairs with a more aesthetic appearance than has previously been available.

This form of permanent non-collapsible kind of wheelchair has a complicated unsightly physical structure, with the components themselves being visually unrefined mechanical elements specifically addressing the needs of chronic care situations.

In wheelchairs of the foldable type, the seat section and the backrest section consist of a foldable material which permits the chair to collapse director-chair style when not in use. During use, this material is stretched loosely between the two sides of the chair. Since there is inadequate tensioning, the foldable material sags in the center in both the seat and the backrest portion. This form of chair therefore rotates the hips inwardly, creating seating discomfort, and provides inadequate lower back support as well.

Comfortable supporting seats for a chair are generally disclosed as part of a regular non-wheeled chair as the subject of patents by the applicant, such patents being U.S. Pat. Nos. 4,529,246, 4,595,235 and 4,555,139 and also application Ser. No. 937,485 filed Dec. 3, 1986, the contents of which are incorporated by reference herein. Such structures have, however, not been applied in a wheelchair structure.

There is thus no chair available for long-term sitting needs which by itself provides adequate comfort or enhanced aesthetic characteristics.

There is accordingly a need to provide wheel chairs with improved comfort and more aesthetic configurations and mechanical detailing.

SUMMARY

By this invention the applicant seeks to fulfill the needs which are lacking in existing wheelchairs.

According to the invention a wheelchair comprises front legs and a rearwardly directed support from each front leg directed to a rear frame structure being formed by rear legs. There are swivel wheels connected with the rear support structure, preferably rear legs.

A supporting seating frame member depends rearwardly from the front legs towards the rear legs for a seat support. Thereafter the frame member is upwardly directed for a back support. In this manner the supporting seating frame is substantially pivotally supported or flexibly cantilevered in a flexible condition by the forward legs so the user of the chair can lean into the chair for increased comfort. A seating fabric extending or spanning across the seating frame forms a seat for the user, and a pair of wheels rotatably fixed with the frame is operable by the user.

Within the front legs, which are hollow tubes, are rollers for mounted rotation at the free ends of the legs which engage the floor surface. The rollers can be simultaneously pushed downwardly against the floor and locked against rotation as desired by means of a rod passing vertically through the front legs and engaging the perimeter surface of the rollers when in a first braked position. In a second (retracted) position the rod is removed from the rollers, and the rollers can retract upwardly a short distance and rotate freely.

The fixed wheels are mounted forwardly of the midpoint between the rear legs and the front legs. In this fashion the larger wheels are in the front, and the smaller wheels are in the rear of the wheelchair. This is contrary to current wheelchair structures which have large wheels rearwardly adjacent the back legs and the small wheels forwardly adjacent the front legs.

A foot support includes a foldable material length which extends forwardly and downwardly from the seat towards the free ends of the support on pivoted arms which are anchored near the free ends of the front legs. The foldable material engages these pivoting arms substantially between the pivot and the free ends of the arms so that there is provided a foot rest section in the front, a first leg support section between the seat and a fold point and a second leg support section between the fold point of the first section and foot rest. In a retracted position the foot support folds out the fold point such that the footrest section rests on the first leg support section. When the foldable material is folded so that the foot rest section rests on the material, the foot rest is below the seat and tilted rearwardly against the folded material.

In the extended position the material is unfolded so as to present a sweeping leg support section and also a footrest section having visual continuity with the plane of the seat portion. The appearance of the chair is thus one of having a visual continuity from the backrest section through the seat section through the leg support and to the footrest section.

The invention is now further described with reference to the accompanying drawings which illustrate different features of the wheelchair.

DRAWINGS

Figure 1:
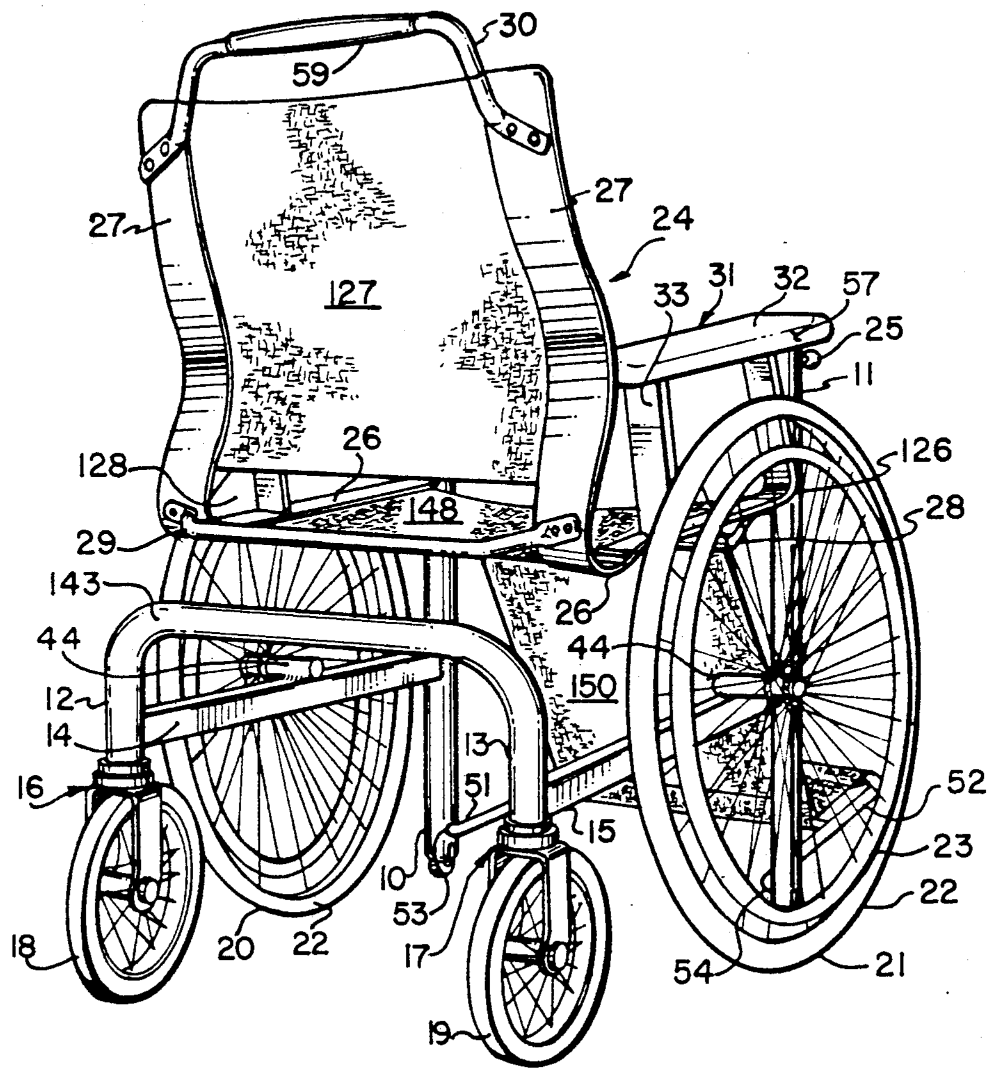
FIG. 1 is a perspective view taken partly from the rear illustrating the wheelchair with the foot support unfolded in the extended position.
Figures 2, 3:
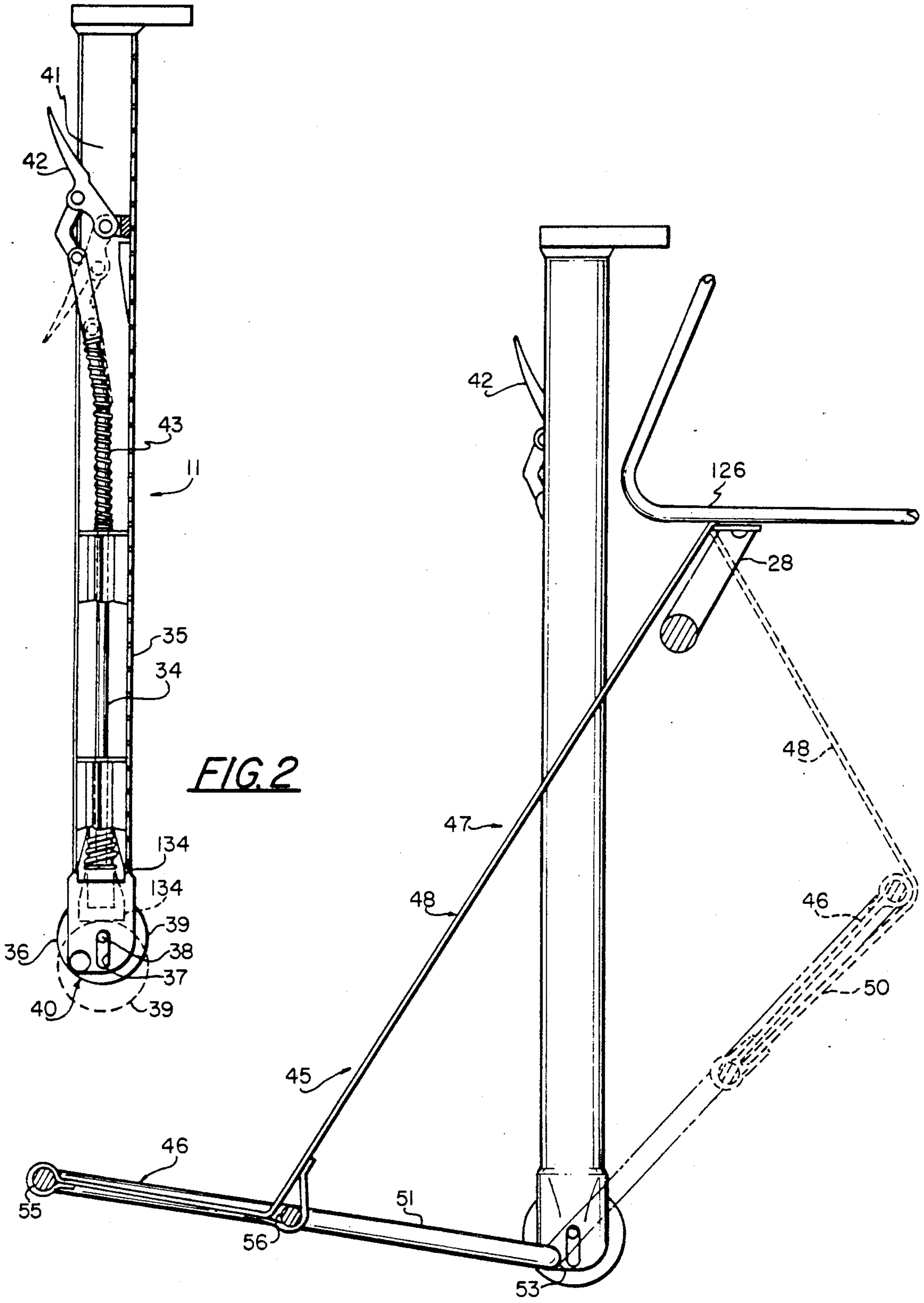
FIG. 2 is a partial section side view of the front leg with a roller in the front leg and a spring loaded rod movable in the front leg.
FIG. 3 is a side elevation view of the front leg illustrating the foot support in the extended position, and in retracted position beneath the seat.

A wheelchair includes two spaced front legs 10 and 11 and two spaced rear legs 12 and 13. Between the front legs 10 and 11 and the respective rear legs 12 and 13 there are rearwardly directed supports 14 and 15. At the free ends 16 and 17 of the rear legs 12 and 13 respectively there are swivel wheels 18 and 19 which are relatively smaller than the front wheels 20 and 21 which are forwardly mounted and located more closely to the front legs 10 and 11. The large fixed or non-swivel wheels 20 and 21 are mounted for rotation on the rearwardly directed supports 14 and 15 forwardly of the midpoint between the front legs 10 and 11 and rear legs 12 and 13. The larger fixed wheels have a tire 22 and a circumferentially internal circular rim 23 which can be operated by the user of the wheelchair.

A supporting seating frame member 24 depends rearwardly and downwardly at 126 from the front legs 10 and 11 from the top free ends 25 of the front legs 10 and 11. After extending about half way towards supports 14 and 15 there is a rearward section 26 which extends towards the rear of the wheelchair and thereafter turns upwardly to form an arcuate curved upwardly directed backrest 27. Pairs of these members 26 and 27 are located along each side of the wheelchair, and along the bottom horizontally-oriented portion they form the frame for the seat support of the chair, and along the back vertically-oriented portion they form the frame for the back support of the chair. Also across the front portion there is a cross bar 28 to keep the transverse rigidity in the seat. Similarly there is a cross brace 29 at the junction between the seat support and a further cross brace and push bar 30 at the topmost portion of the backrest above the backrest. Between the top of the frame portions 27 and the seat rest portions 26 extends a seating fabric 127 and 148 to form the backrest and the seatrest.

Also extending from the top of the front legs 10 and 11 rearwardly towards the backrest 27 are arm frames 31 which have a horizontal section 32 and a substantially downwardly directed section 33 which engages the seat frame portion 26 towards the rear of the seat frame and near the juncture with the backrest 27. The arm frames 31 have armrest caps 57 which cover the horizontal section 32 of the frames constituting the arm frames 31.

In the front, legs 10 and 11, which are hollow tubes 35, there is located a rod 34 which extends longitudinally down the legs 10 and 11. At the free end 134 of the front legs 10 and 11 there is a slotted structure 36 with vertical slots 37 to receive the axle 38 of a roller 39. This mounting means permits the roller 39 to move axially relatively upward and downwardly in the front legs 10 and 11. In a first position the free end 134 of the rod 34 abuts against the perimeter 40 of the roller 39 and acts to brake rotation of the roller 39 and the wheelchair. In this position the roller 39 is extended outwardly so that the axle 38 moves to the bottom extremity of the slots 37 so the roller 39 can thus engage the floor surface, and preclude the chair from rolling. In the second position the rod 34 is extended upwardly in the tubes 35 so the axle 38 moves to the upper end of slot 37 at the free end of legs 10 and 11. In this case the roller 39 can rotate about its axles 38 as the rod 34 does not engage the outer circumference 40 of the roller 39. In this retracted position the extreme bottom of front legs 10 and 11 are lifted from the floor surface, and the larger front wheels 20 and 21 can then be rolled and the chair thus wheeled as required. The rod 34 can be extended to brace the roller 39 by rotating the lever 42 into its lower position (indicated by the dotted lines). In the lower position, the spring and lock configuration 43 within the hollow portion 41 of the tube 35 locks the wheel 39 in place.

In an alternative construction, a lever arm is provided near the top of front legs 10 and 11 which through a pinion gear and a rack configuration of the upper end of rod 34 lifts and lowers rod 34 either to retract or extend and brace wheel 39.

The rear legs 12 and 13 are connected with a cross support member 143, and a bearing 44 in the rearwardly directed supports 14 and 15 house the axles for the non-swiveling larger front wheels.

A foot support structure 45 includes a footrest section 46 and a legrest section 47, the latter being divided into a first leg support section 48 adjacent the seat perimeter 49 and a second section 50 adjacent the footrest section 46. The foot support structure 45 is foldable between a retracted position beneath the seat periphery 49 and a position extending ahead of the seat periphery 49. Two spaced pivoting arm struts 51 and 52 respectively are pivoted about pivot mounts 53 and 54 substantially lower than half way along the length of the front legs 10 and 11, and relatively close to the floor engaging-free ends. The pivoted arm struts 51 and 52 have between them one cross beam 56 partly between end 55 of the foot support structure 45 and the pivots 53 and 54.

The foot support sections 46, and leg support sections 48 and 50 include a foldable material length 150 which extends from the seat perimeter 49 either continuously or having been affixed to the end of the seat perimeter 49 by suitable stitching or the like. In the extended position the foot support 45 constitutes a natural visually flowing extension from the seat 49 and the backrest portion 127. There is a gap 128 being located between the backrest portion 127 and the seat 148. The overall appearance is aesthetically pleasing. The foot support forms a substantially L-shaped structure.

In the retracted position of the foot support 45 the footrest section 46 is folded inwardly so that the pivot arm struts 51 and 52 turn about their pivot points 53 and 54. The footrest section 46 is located at least partly between the first portion 48 and second portion 50. The end 55 is located between the first and second sections 48 and 50 portions of the first legrest support section 47. In this manner the footrest portion 46 is folded into a resting position against the sections 48 and 50 in a fold wherein the foot support 46 is retracted beneath the seat 148. In this manner the foot support is neatly withdrawn from the front part of the chair to facilitate ingress and egress. The chair thusly has the characteristics of a more conventional piece of sitting furniture rather than an invalid's equipment.

The horizontal portion of arm frames 32 are suitably covered with caps 57 to provide comfortable rest surfaces for the arms.

The overall deflecting of the arm frames 32, the seat support 148 and backrest 127 about a support channel atop the free end 25 at the top of front legs 10 and 11 provides for a gentle rocking effect to be imparted to the supporting aspects of the wheelchair. Thus the wheelchair provides for a sturdy support of a user and likewise specific comfort features which have not previously been obtainable in wheelchairs.

At the rear of the backrest 127 the cross brace 30 also acts as a handle 59 whereby a user can be maneuvered by a helper in required circumstances.

The structure of the wheelchair is one where the larger non-swiveling front wheels 20 and 21 are forwardly located of the smaller rear swivel wheels 18 and 19. When a user requires to brake the chair motion the lever 42 is rotated into position to lock the rollers 39 from rotation and simultaneously push them downwardly to the most extended position in order to engage the floor surface.

The rollers 39 in extended, locked position provide for a sturdy structure when a user tries to lift himself from a chair by pressing downwardly on the forward end of the armrest caps 57. A positive engaging action of the rollers 39 can then be felt with the floor, and the user can lift himself securely from the chair. Contrarily, for wheeling movement the rods 34 are elevated, and the rollers 39 are allowed to rise in their axle 38 mounting slots 37. The user can then turn the non-swiveling front wheels 20 and 21 as required to move the chair. When confronting inclined floors and ramps, the front legs 10 and 11 and the freely rotating rollers 39 engage the change in angle surface first and assure smooth transition of the wheelchair from an incline down to the new level.

Many other forms of the invention exist, each differing from the other matters of detail and as regards the body support potions only.

In some embodiments the rocking support seat 148 and back 127 may be differently mounted on the leg structure to provide adequate support. The material constituting the seat 148 and back 127 may be a suitable breathing fabric which is stretchable to provide adequate transverse and longitudinal support for the user. In other cases the seat is pivotally supported from the front legs from a point about midway between the top and bottom of the legs. An upward extension of the front legs can be rearwardly directed for armrests.

In some cases the seat supporting frame depends rearwardly from a point on the front legs intermediate the top of the legs and continues backwardly and is remotely from the front legs directed upwardly to form a back-supporting frame.

The body and support portions can be varied to form different constructions. In other cases the mechanism for operating the brake and rollers in the front legs can be different. For instance, in place of the lever system protruding through the opening in the leg, an axially retractable rod can be provided with a rotating lever handle mechanism to increase the mechanical advantage on the rod via a rack and pinion gear, or the axially retractable rod can be provided with a handle mechanism which permits for axial rotation of the rod, thus moving the rod upwardly and downwardly via screw means to interact with the roller.

The scope of the invention is to be interpreted solely by the accompanying claims.

I claim:

1. A rocking wheelchair comprising:

(a) spaced front legs, bottom portion of the front legs including rollers mounted for rotation on a floor;

(b) rearwardly directed supports extending from the front legs;

(c) a rear frame connected with the rearwardly directed supports, the rear frame including a pair of rear wheels;

(d) a rocking supporting seating frame member substantially pivotally supported and flexibly cantilevered from the front legs and depending rearwardly of the front legs towards the rear frame, the seating frame member having a seat support section and a back support section;

(e) a seating means supported by the seat support section of the seating frame member;

(f) forward wheels supported off of the rearwardly directed supports; and (g) means for mounting the rollers for permitting location selectively in an extended non-rotating floor-engaging position and in a retracted, floor-engaging rotating position.

2. A wheelchair as claimed in claim 1 wherein bottom portion of the front legs include rollers mounted for rotation on a floor.

3. A wheelchair as claimed in claim 1 wherein the forward wheels are mounted on the rearwardly directed supports forwardly of a midpoint between the rear frame and the front legs.

4. A wheelchair as claimed in claim 2 including means for locking the rollers against rotation.

5. A wheelchair as claimed in claim 1 including armrests directed rearwardly from upper free ends of the front legs.

6. A wheelchair as claimed in claim 1 wherein the means for mounting the rollers includes vertically directed spaced slots in the front legs for securing axles for the rollers, the front legs being tubular, and a vertically movable rod provided internally of the legs (i) for selectively urging the rollers downwardly into the extended, non-rotating floor-engaging position and (ii) for permitting upward movement of the rollers into the retracted, rotating position for rotation on the floor.

7. A wheelchair as claimed in claim 6 including a lever mechanically linked to the rod through an opening in the tubular front legs, the lever in a first position urging the rod and rollers downwardly into the extended, non-rotating, floor-engaging position and in a second position permitting the rod to disengage from the rollers whereby the rollers retract into the retracted, rotating portion, and whereby in the first position the rollers act as a brake against movement.

8. A wheelchair as claimed in claim 1, including a foot support supported by the front legs, and means for folding the foot support between a retracted position totally beneath the seating means, so that a wheelchair user can enter and exit the wheelchair without interference form the foot support, and an unfolded position extending forward of the seating means.

9. A wheelchair as claimed in claim 1 wherein the foot support includes a pair of arm struts, and means for pivotally attaching the arm struts to the front legs for pivotal movement between the extended position and the retracted position.

10. A rocking wheelchair comprising:

(a) spaced front legs, bottom portion of the front legs including rollers mounted for rotation on a floor;

(b) rearwardly directed supports extending from the front legs;

(c) a rear frame connected with the rearwardly directed supports, the rear frame including a pair of rear wheels;

(d) a rocking supporting seating frame member substantially pivotally supported and flexibly cantilevered from the front legs depending rearwardly of the front legs towards the rear frame, the seating frame member having a seat support section and a back support section;

(e) a seating means supported by the seat support section of the seating frame member;

(f) forward wheels supported off of the rearwardly directed supports; and (g) a foot support supported by the front legs, the foot support including:
(i) a pair of arm struts;
(ii) a cross beam between the arm struts, the cross beam being located inwardly from the free ends of the arm struts;
(iii) a foldable material length extending from the seat support towards the arm struts, the material length engaging the cross beam and the arm struts substantially at the free ends of the arm struts, such that in the extended position the material length forms a substantially L shape facing away from the seat support; and
(iv) means for pivotally attaching the arm struts to the front legs for pivotal movement between the extended position and retracted position; and
(h) means for folding the foot support between a retracted position totally between the seating means, so that a wheel chair user can enter and exit the wheel chair without interference from he foot support, and an unfolded position extending forward of the seating means.

11. A wheelchair as claimed in claim 10 wherein in the retracted position the material folds about a point between the cross beam and the seat support.

12. A wheel chair as claimed in claim 10 wherein the foot support forms a foot rest forward of the cross beam, the foot rest extending from the lower end of the leg rest section in the unfolded position.

13. The wheelchair of claim 1
wherein the seating means comprises seating material supported by the frame member to form a seat support and a back support.

14. A wheelchair as claimed in claim 13 wherein the front wheels are mounted forwardly of a midpoint between the rear frame and the front legs.

15. A wheelchair as claimed in claim 14 including means for locking the rollers against rotation.

16. A wheelchair as claimed in claim 15 including means for mounting the rollers for permitting location selectively in a non-rotating, floor-engaging position and in a rotating, floor-engaging position.

17. A wheel chair comprising:
(a) spaced front legs;
(b) rearwardly directed supports extending from the front legs;
(c) a rear frame connected with the rearwardly directed supports;
(d) rear wheel means mounted on the rear frame;
(e) a supporting seating frame member supported by the front legs;
(f) seating material supported by the frame member to form a seat support and a back support;
(g) a pair of front wheels supported off the rearwardly directed supports;
(h) lower portion of the front legs including rollers mounted for rotation on a floor;
(i) a foot support supported by the front legs, the foot support including:
(i) a pair of arm struts;
(ii) a cross beam between the arm struts inwardly from free ends of the arm struts;
(iii) a foldable material length extending from the seat support towards the arm struts, the material length engaging the cross beam of the arm struts substantially at the free ends of the arm struts, such that in the extended position the material length forms a substantially L shape facing away from the seat support; and
(iv) means for pivotally attaching the arm struts to the front legs for pivotal movement between the extended position and the retracted position; and
(j) means for folding the foot support between (i) a retracted position totally between the seat support so that a wheel chair user can enter and exit the wheel chair without interference from the foot support, and (ii) an unfolded position extending ahead of the seat support.

18. A wheelchair as claimed in claim 17 wherein free ends of the front legs include rollers mounted for rotation on a floor.

19. A wheelchair as claimed in claim 17 wherein the front wheels are mounted forwardly of a midpoint between the rear support and the front legs.

20. A wheelchair as claimed in claim 17 including means for locking the rollers against rotation.

21. A wheelchair as claimed in claim 17 wherein the foot support includes a pair of arm struts, and means for pivotally attaching the arm struts to the front legs for pivotal movement between the extended position and the retracted position.

22. A wheel chair comprising:
(a) spaced apart front legs, free ends of the front legs including rollers mounted for rotation on a floor;
(b) rearwardly directed supports extending from the front legs;
(c) a rear support connected with the rearwardly directed support;
(d) wheel means connected with the rear support;
(e) a supporting seating frame member supported by the front legs and providing a seat and back support;
(f) a pair of front wheels connected with the rearwardly directed supports and mounted forwardly of a midpoint between the rear support and the front legs;
(g) a foot support supported by the front legs including:
(i) a pair of arm struts;
(ii) a cross beam between the arm struts inwardly from free ends of the arm struts;
(iii) a foldable material length extending from the seat and back support towards the arm struts, the material length engaging the cross beam and the arm struts substantially at the free ends of the arm struts, such that in the extended position the material length forms a substantially L shape facing away from the seat and back support; and
(iv) means for pivotally attaching the arm struts to the front legs for pivotal movement between the extended position and retracted position;
(h) means for folding the foot support between (i) a retracted position totally beneath the seat and back support so that a wheel chair user can enter and exit the wheel chair without interference from the foot support, and (ii) an unfolded position extending ahead of the seat and back support; and
(i) means for locking the rollers against rotation.

23. A wheelchair as claimed in any one of claims 1, 17, or 22 wherein the rear frame includes rear legs and the rear wheels are swivel mounted on the rear legs.

24. A wheelchair as claimed in claim 1, 17, or 22 wherein the supporting seating frame member depends downwardly from the upper free ends of the front legs and is then directed rearwardly towards the rear support, and then upwardly to form a back-support frame.

25. A wheelchair as claimed in claim 23 wherein the supporting seating frame member depends downwardly from the upper free ends of the front legs and is then directed rearwardly towards the rear support.

26. A wheelchair as claimed in claim 1, 17, or 22 wherein the supporting frame member depends rearwardly from a point on the front legs intermediate the top of the legs and the bottom of the front legs and is remotely from the front legs directed upwardly to form a back-supporting frame.

27. A wheel chair comprising:

(a) spaced apart front legs having a lower portion;

(b) rearwardly directed supports from the front legs;

(c) a rear frame connected with the rearwardly directed supports;

(d) rear wheel means supported by the rear frame;

(e) a supporting seating frame member depending rearwardly off the front legs towards the rear frame and then upwardly from the rear frame, the seating frame member comprising a pair of seating elements;

(f) a seating means extending between the seating elements;

(g) a pair of forward wheels supported off of the rearwardly directed supports;

(h) rotatable rollers mounted on the lower portion of the front legs; and (i) means for mounting the rollers for permitting location selectively in an extended, non-rotatable, floor-engaging position and in a retracted, floor-engaging, rotating position, the means for mounting the rollers including vertically directed spaced slots in the front legs for securing axles for the rollers, the front legs being tubular, and a vertically movable rod being provided internally of the legs (i) for selectively urging the rollers downwardly into the extended, non-rotating floor-engaging position and (ii) for permitting upward movement of the rollers into the retracted, rotating position for rotation on the floor.

28. A wheelchair as claimed in claim 27 including a lever mechanically linked to the rod in the tubular front legs, the lever in a first position urging the rod and rollers downwardly into the extended, non-rotating, floor-engaging position and in a second position permitting the rod to disengage from the rollers whereby the rollers retract into the retracted, rotating position, and whereby in the first position the rollers act as a brake for movement.

29. A wheelchair comprising:

(a) spaced apart front legs, (b) rearwardly directed supports supported by and extending from the front legs, (c) a rear frame connected with the rearwardly directed supports, (d) rear wheel means supported by the rear frame, (e) a supporting seating frame member depending rearwardly from the front legs towards the rear frame to provide a seat support section, a rearward portion of the frame member extending upwardly to form a back support section, (f) a seating means supported by the seat support section, (g) a pair of large non-swiveling forward wheels mounted rearwardly of the front legs to be rotatably operable by a user, (h) a foot support, and (i) means for folding the foot support between (i) a retracted position totally beneath the seat so that a wheelchair user can enter and exit the wheelchair without interference from the foot support and (ii) an unfolded position extending ahead of the seat, the foot support comprising:

(1) a pair of arm struts, (2) means for pivotally attaching the arm struts to the front legs for pivotal movement between the unfolded position and the retracted position, (3) a cross beam between the arm struts inwardly from the free ends of the arm struts, and (4) a foldable material length extending from the supporting seating frame member towards the arm struts, the material length engaging the cross beam and the arm struts substantially at free ends of the arm struts such that in the extended position the material length forms a substantially L shape facing away from the supporting seating frame member.

30. A wheelchair as claimed in claim 29 wherein in the retracted position the material length folds about a point between the cross beam and the supporting seating frame member.

31. A wheelchair as claimed in claim 29 wherein the foot support forms a foot rest forward of the cross beam, the foot rest extending from the lower end of the leg rest section in the unfolded position.

32. A wheelchair comprising (a) spaced apart front legs having lower free ends, (b) rearwardly directed supports supported by and extending from the front legs, (c) a rear frame supported by the rearwardly directed supports, (d) rear swivel wheel means mounted with the rear frame, (e) a supporting seating frame member supported by the front legs, (f) a seating material supported by the seating frame member to form a seat and a back, (g) a pair of large front wheels mounted off of the rearwardly directed supports to be rotatably operable by a user, (h) rollers mounted for rotation and for engaging a floor-surface on the lower free ends of the front legs, (i) a foot support supported by the front legs, and (j) means for folding the foot support between (A) a retracted position beneath the seat so that a wheelchair user can enter and exit the wheelchair without interference from the foot support and (B) an unfolded position extending ahead of the seat, the foot support comprising (1) a pair of arm struts, (2) means for pivotally attaching the arm struts to the front legs for pivotal movement between the unfolded position and the retracted position, (3) a cross beam between the arm struts inwardly from the free ends of the arm struts, and (4) a foldable material length extending from the supporting seating frame member towards the arm struts, the material length engaging the cross beam and the arm struts substantially at free ends of the arm struts such that in the extended position the material length forms a substantially L shape facing away from the supporting seating frame member.

33. A wheelchair comprising (a) spaced apart front legs having a lower portion, (b) rollers mounted on the lower portion of the front legs for rotation and for engaging a floor-surface, (c) rearwardly directed supports extending from the front legs directed to a rear support, (d) swivel wheel means connected with the rear support, (e) a seat and a back support supported by the front legs, (f) a pair of front wheels to be rotatably operable by a user and mounted off of the rearwardly directed supports forwardly of a midpoint between the rear support and the front legs, (g) a foot support, (h) means for folding the foot support between (i) a retracted position beneath the seat so that a wheelchair user can enter and exit the wheelchair without interference from the foot support and (ii) an unfolded position extending ahead of the seat, the foot support comprising (1) a pair of arm struts, (2) means for pivotally attaching the arm struts to the front legs for pivotal movement between the unfolded position and the retracted position, (3) a cross beam between the arm struts inwardly from the free ends of the arm struts, and (4) a foldable material length extending from the supporting seating frame member towards the arm struts, the material length engaging the cross beam and the arm struts substantially at the free ends of the arm struts such that in the extended position the material length forms a substantially L shape facing away from the supporting seating frame member, and (i) means for locking the rollers against rotation.

34. A wheelchair as claimed in claim 1, 17 or 22 wherein the supporting seating frame member comprises two parallel strips of metal and a push handle means attached to each of the two strips proximate to the top end of the back support for providing transverse rigidity of the back support and for maneuvering the wheelchair.

35. The wheelchair claimed in claim 17 or 22, wherein the means for folding the foot support folds the foot support into its retracted position without folding the remainder of the wheelchair.

* * * * *